April 11, 1961   D. C. SHERMAN, SR   2,979,550
ELECTRODE SEAL
Filed March 13, 1959   4 Sheets-Sheet 1
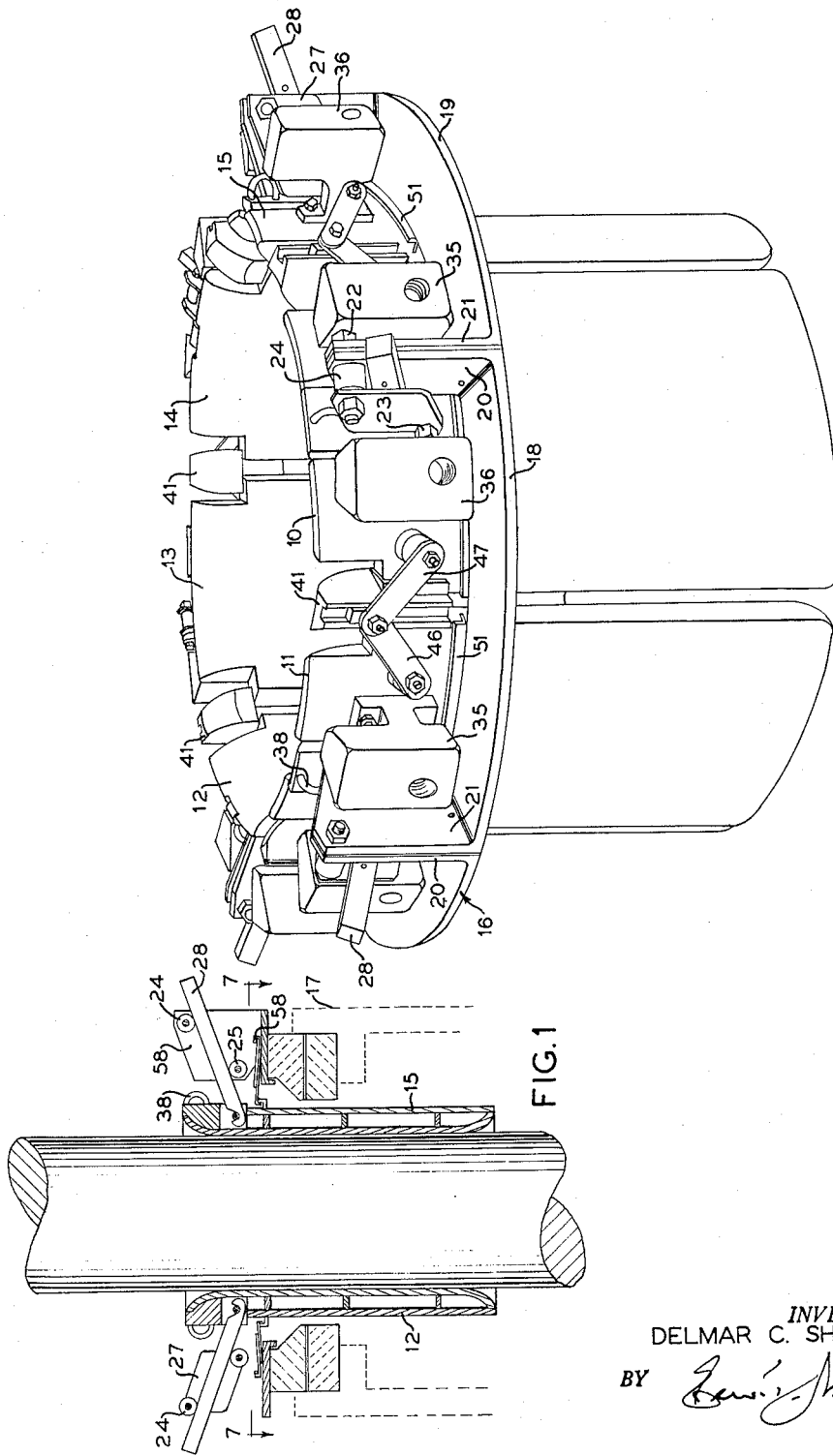
*INVENTOR:*
DELMAR C. SHERMAN, SR.
BY
ATTORNEY

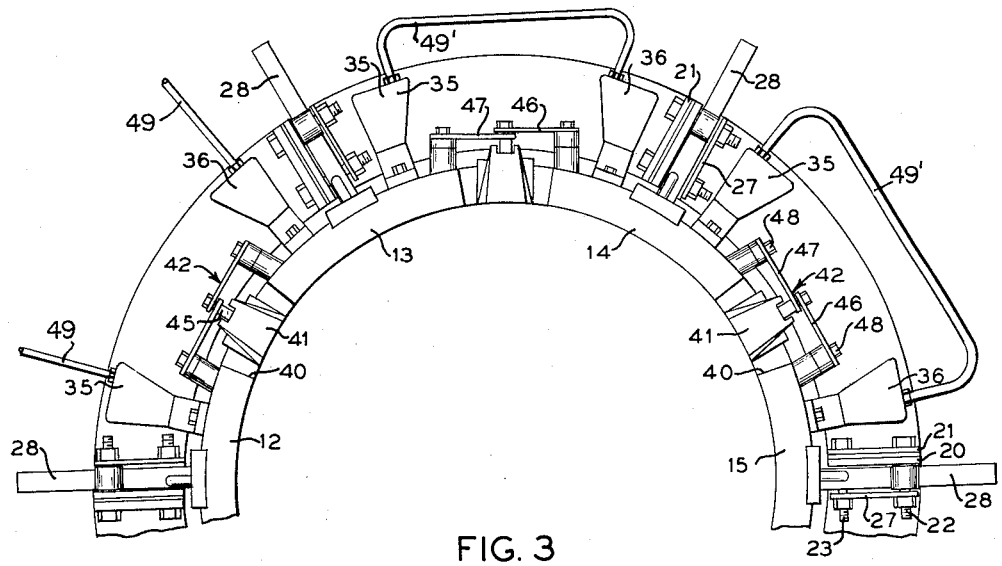
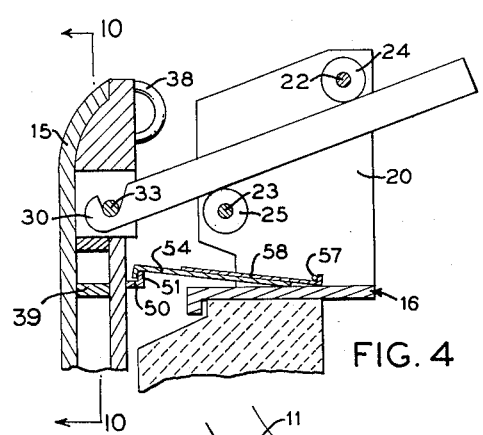
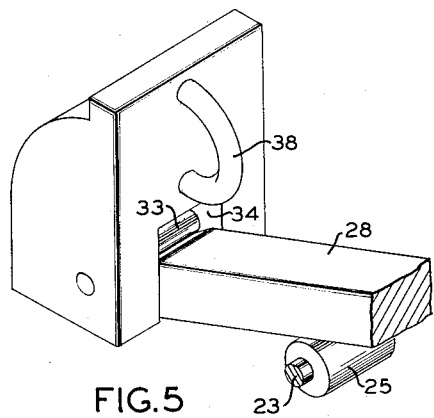
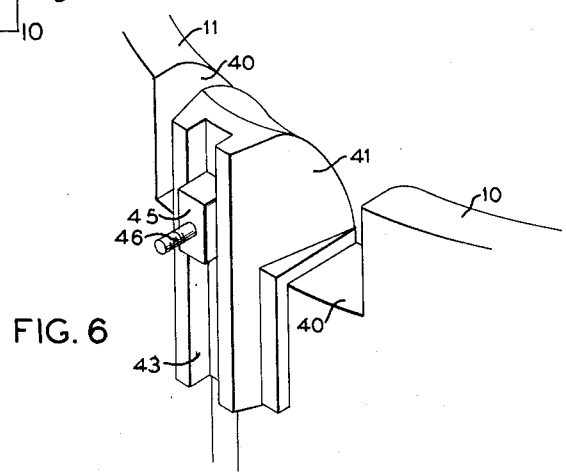

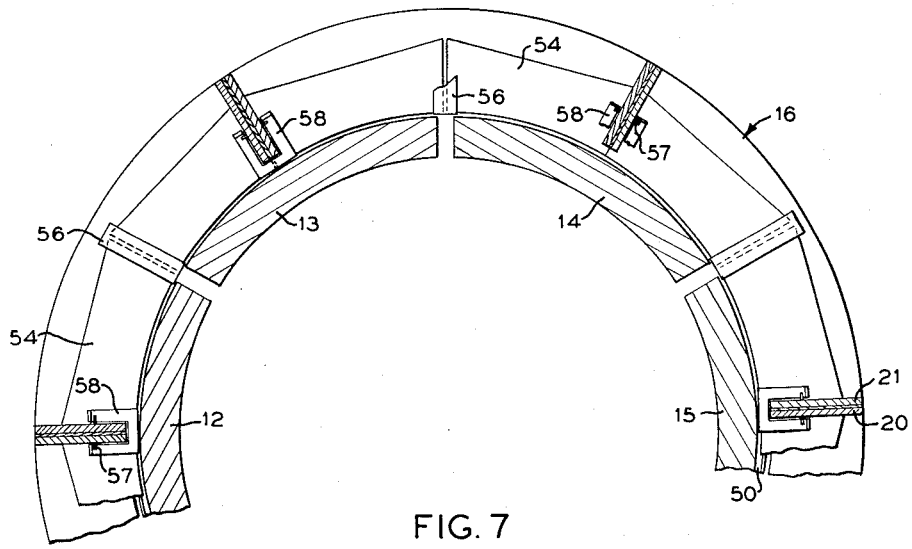
FIG. 7
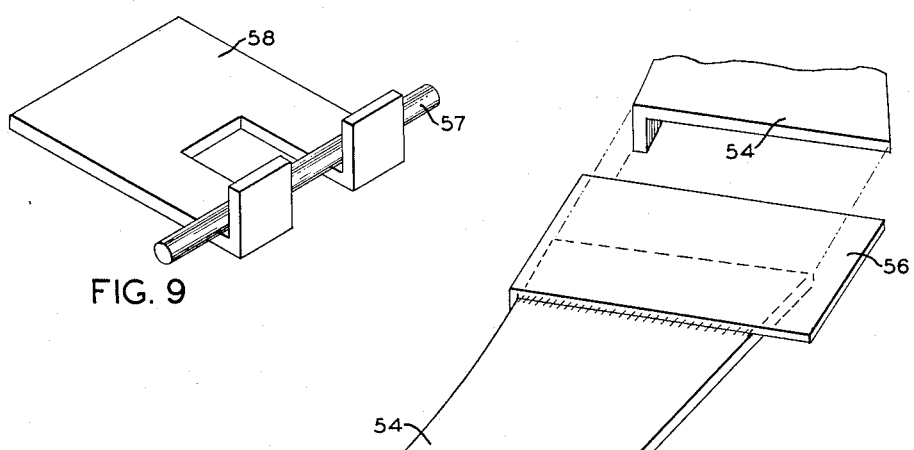
FIG. 9
FIG. 8
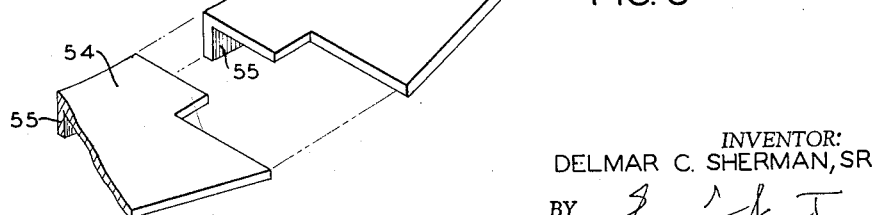
INVENTOR:
DELMAR C. SHERMAN, SR
ATTORNEY April 11, 1961     D. C. SHERMAN, SR     2,979,550
ELECTRODE SEAL
Filed March 13, 1959     4 Sheets-Sheet 4
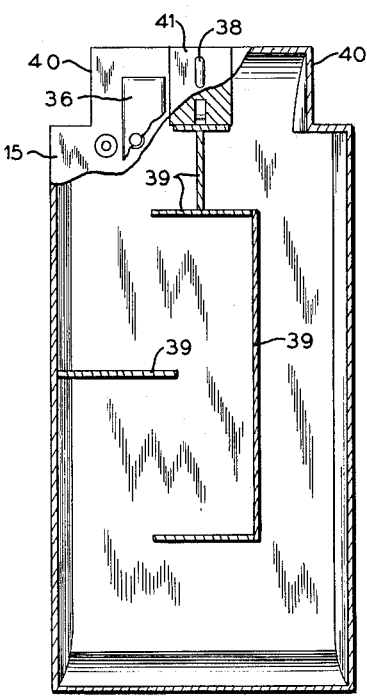
FIG. 10
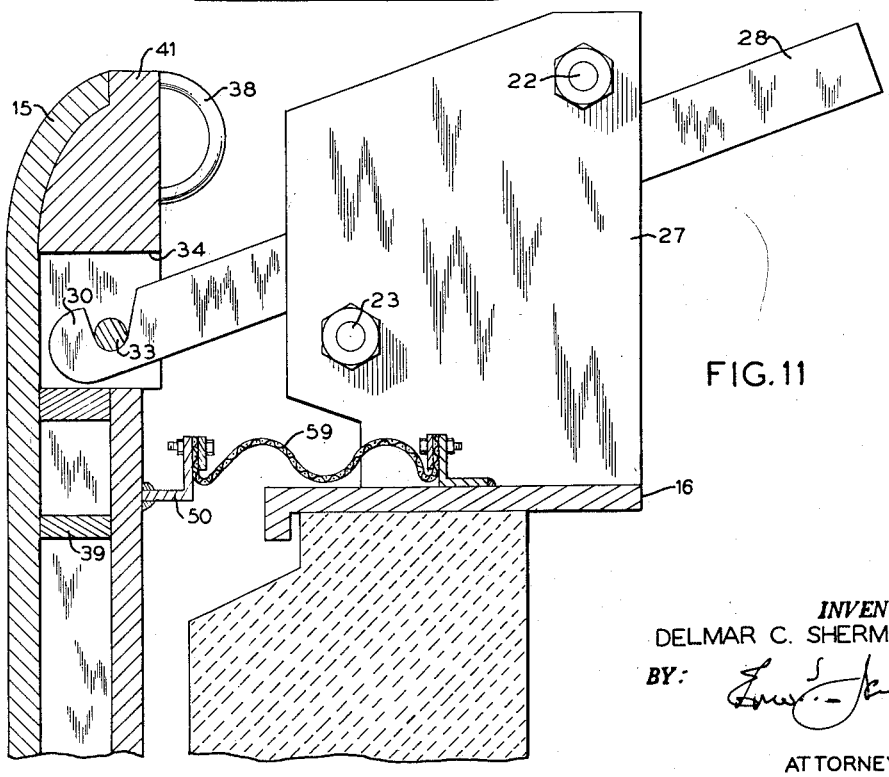
FIG. 11
INVENTOR:
DELMAR C. SHERMAN, SR.
BY: 
ATTORNEY United States Patent Office 2,979,550
Patented Apr. 11, 1961

2,979,550

ELECTRODE SEAL

Delmar C. Sherman, Sr., Chattanooga, Tenn., assignor to Tennessee Products and Chemical Corporation, Nashville, Tenn., a corporation of Tennessee Filed Mar. 13, 1959, Ser. No. 799,248

11 Claims. (Cl. 13—17)

This invention relates to an electrode seal, and more particularly concerns an electrode seal for use in an electric furnace to seal the space between the electrode and the furnace wall or cover through which the electrode passes.

In the operation of an electric furnace, the portion of the electrode within the furnace is subjected to very high temperatures resulting in a high rate of electrode consumption, and often causing the development of internal strains which tend to effect disintegration thereof. Moreover, variations in concentricity, surface irregularities and misalignment of the electrode in conventional prior art sealing arrangements permit the escape of hot gases along the surface of the electrode from the furnace into the air, tending to erode the electrode as well as contaminate the external air.

One of the objects of this invention, therefore, is to overcome these and many other problems known to the prior art by the provision of a new and improved electrode seal which functions to form a gas tight seal between the electrode and the furnace aperture through which it passes.

Another object of this invention is to provide a new and improved electrode seal which economizes electrode consumption by having a considerable area of water cooled surface in direct contact with the electrode.

Still another object of this invention is to provide a new and improved electrode seal which permits angular and sidewise shifting of electrode in its aperture, as well as accommodating variations in diameter and concentricity of the electrode.

A further object of this invention is to provide a new and improved electrode seal which permits smooth, uninterrupted slippage of the electrode within the seal without regard to abrupt variations in diameter of the same or successive electrodes.

A still further object of this invention is to provide a new and improved electrode seal which is simple in construction and operation and well adapted to meet the demands of economic manufacture.

Other objects, features and advantages of the present invention will become apparent from consideration of the following specification taken in conjunction with the accompanying drawings, wherein like designators refer to the same or similar parts throughout the several views, and in which:

Fig. 1 is a perspective view of one preferred form of electrode seal according to the invention.

Fig. 2 is a fragmentary view, partly in section, showing the electrode seal of Fig. 1 in contact with an electrode in an aperture in the furnace wall.

Fig. 3 is a top view, partly broken away, of the electrode seal of Fig. 1.

Fig. 4 is a fragmentary detail showing the support and sealing arrangement between one of the sealing segments and the furnace wall.

Fig. 5 is a fragmentary detail showing the arrangement for securing the track bar to the outside of the sleeve segment.

Fig. 6 is a fragmentary detail showing one of the arrester blocks for preventing the escape of gases through the gap between the adjacent segments.

Fig. 7 is a cross sectional view, taken along lines 7—7 of Fig. 2, showing the flashing arrangement for closing the annular space between the segments and the supporting rim.

Fig. 8 is a fragmentary detail showing the overlapping closure plates of Fig. 7.

Fig. 9 is a detail showing a connector plate, of the overlapping assembly of Fig. 7, that straddles the upstanding flanges of the supporting rim.

Fig. 10 is an elevational view of a segment partially broken away.

Fig. 11 is an enlarged detail view partly in section of a modification of the rim showing the sealing cloth.

Referring now more particularly to the drawings, the invention as shown in Figs. 1 and 2 may be characterized by a plurality of segments 10, 11, 12, 13, 14 and 15 which are each independently supported from a stationary external rim 16 so as to define a generally cylindrical vertical aperture therethrough. Rim 16 is, in turn, supported from the sleeve 17 of a semi-covered furnace, generally indicated by broken lines in Fig. 1. Adjacent sections 18 and 19 of rim 16 are secured together by their upstanding end flanges 20 and 21. Laterally supported from upstanding flanges 20 and 21 are studs 22 and 23 and a pair of spaced rollers 24 and 25, as shown most clearly in Fig. 4. The innermost roller 25 is spaced inwardly radially and downwardly from outer roller 24, with a bracing plate 27 secured between the outer ends of the studs supporting the rollers. An inclined track bar 28 is positioned between rollers so that the top side of the outer end of track bar 28 engages the under side of roller 24, and the underside of the inner end of track bar 28 engages the upper side of roller 25. This arrangement is such that the innermost radial end of the track bar is formed with an upwardly opening hook 30 to support one of the segments. For this purpose the uppermost end of each segment is provided with a support pin 33 centrally recessed in the upper end thereof, as at 34, engaging the hook 30 of track bar 28 so as to support the segment therefrom. To insure intimate contact of each segment with the electrode, the track is pivoted thereto in such manner that the segment is suspended at a point above its center of gravity and then counterweighted, the effect of the counterweights being to press the lower end of each segment inwardly in a radial manner. For this purpose, bolted to the upper end of each segment and extending radially outwardly therefrom are a pair of counterweights 35 and 36 which cause the segment to pivot about its support point so as to effect more intimate engagement with the electrode. Since each segment is quite heavy, a lifting lug 38 is provided at the upper end of each segment to facilitate handling.

As most clearly seen in Fig. 2, each segment is compartmented so as to function as a water jacket against the electrode, with the input and output water lines 49 to the segment being connected through the counterweights. In this respect it will be noted that the interior of each segment is baffled, as by baffles 39, to insure a circulating path for the cooling water, which may of course be connected from segment to segment through the counterweights by suitable flexible metallic tubes 49'. Each segment is of sufficient length parallel to the axis of the electrode so as to provide sufficient protection and to obviate binding. To further facilitate adjustment of the seal to the contour of the electrode, the upper end of each segment is formed with an outwardly curved lip, which also functions to simplify entry and slippage of the electrode.

It will be noted that adjacent segments normally have a gap therebetween to permit variance in the diameter of the seal so that the inclined track arrangement may adjust for varying diameter in the electrode as well as variations in concentricity, even though the axis of the electrode should become slanted with respect to the furnace aperture. An essential feature of the invention is the arrangement for arresting the escape of gases through this longitudinal gap between adjacent segments of the seal. The upper corners of each segment are formed with a generally rectangular notch, as at 40, having a flat base portion or shoulder. Resting on the shoulders of adjacent segments is an arrester block 41 which is so formed as to have an inwardly radial face that is of the same general configuration as the inner peripheral surface of each segment, and having an outer depending leg that closes the gap between the outer peripheral wall of adjacent segments.

Block 41 is centered between adjacent segments and held in proper position by a self-centering mechanism, generally indicated at 42. For this purpose the outer wall of the block is provided with a vertical rectangular slot or track 43 in which a slider 45 is positioned. Pivoted to pin 46 on slider 45, and extending oppositely therefrom, are the links 46 and 47, each having its outer end pivotally secured to a stud, as at 48, extending from one of the adjacent segments. Thus, as the segments, such as segments 10 and 11, move inwardly in a radial manner, the gap between the segments closes thereby causing slider 45 to ride upwardly in the sealing block track 43 so as to maintain the arrester block centered between the segments. In like manner, as the segments move outwardly to adjust for electrode configuration, the gap widens and the slider moves downwardly in the sealing block track so as to also maintain the block centered between the segments. Centering links 46 and 47 also function to urge the sealing block radially inwardly, with the depending leg thereof being pressed against adjacent segments and the inner radial face thereof being pressed against the electrode so as to provide an effective seal for each variable gap between adjacent segments.

For the annular space between the segments and supporting rim 16, suitable closure is provided which permits the independent action of each segment so as not to interfere with the sealing effect of the closure. As shown in Figs. 1 and 2, a shoulder 50 with an upstanding flange 51 is secured along the outer peripheral wall of each segment at approximately the level of supporting rim 16. Disposed about the outer periphery of the segments are a plurality of sealing plates, as at 54, each having an arcuate depending flange 55 at the innermost radial side thereof that engages over the upstanding flange 51 of the shoulder of each segment. The outer end of each sealing plate rests on the horizontal surface of supporting rim 16 and slides inwardly and outwardly thereon as the electrode seal increases and decreases in diameter. Providing for a seal between adjacent sealing plates is an overlapping union plate 56 which is welded to the upper side of one plate as shown most clearly in Fig. 8, and adapted to receive slidably thereunder the adjacent sealing plate. To provide for a similar type sealing about the upstanding flanges, such as 20 and 21, on adjacent rim sectors 18 and 19, a pin 57 passes through these upstanding flanges just above, but parallel to, the horizontal portion of the support rim 16. A U-shaped connector plate 58, shown in Figs. 7 and 9, straddles the upstanding flanges of rim 16, the arrangement being such that the outermost ends of the leg members of U-shaped plate 58 are upturned so as to engage under pin 57. It can be seen, then, that irrespective of a diameter and orientation assumed by the electrode segments in conforming to the configuration and position of the electrode, the annular space between the segments and rim 16 is effectively sealed even during the automatic resetting of such segment.

In the practice of the invention, however, it will be noted that any other arrangement of materials may be utilized to accomplish the closure of the annular space between the segments and the supporting rim, such as by a cloth 59 (Fig. 11) woven of reinforced asbestos, as may be dictated by the nature of the operation and design of the furnace on which the seal is to be installed.

From the foregoing construction it can be seen that the electrode seal of the present invention provides a substantially gastight seal between the electrode and the aperture it passes through. In the application herein shown, the aperture is formed by sleeves of a "half covered" furnace, but it is to be understood, of course, that the seal could be adapted to be utilized in completely closed furnaces as well. The support arrangement for each segment is such as to permit independent positioning thereof so that it may move in a radial manner inwardly or outwardly with respect to the axis of the electrode and be free to adjust itself to the surface of the electrode, even though the surface is not truly cylindrical and even though the axis of the electrode should become slanted with respect to the aperture. In addition, it will also be apparent that the length of each segment is such as to provide for adequate contact even though there are substantial irregularities in the surface of the electrode and to greatly economize electrode consumption by the cooling effect on the electrode.

From the foregoing it will be apparent that I have provided a new and improved electrode seal which is well adapted to fulfill the aforestated objects of the invention. Moreover, whereas the invention has been described with respect to an embodiment that gives satisfactory results, it will be understood by those skilled in the art to which this invention most nearly appertains that modifications and variations thereof may be resorted to without departing from the spirit or scope of the invention as defined by the appended claims.

I claim:

1. In an electrode seal, a stationary horizontal rim, a plurality of elongate cylindrical segments, means pivotally supporting each segment from said rim on the inside thereof so as to define a generally vertical aperture to receive an electrode, said segments having internal passages for the circulation of water therethrough, a plurality of arrester blocks, and means for centering each of said blocks between adjacent segments so as to form a gas tight seal therebetween.

2. In an electrode seal, a stationary horizontal rim, a plurality of elongate cylindrical segments defining a generally vertical aperture therethrough, means on said rim pivotally supporting each of said segments at a point above its center of gravity tending to cause each segment to pivot about said support point in one direction, and a pair of spaced counterweights secured to each segment above said support point tending to cause each segment to pivot about said support point oppositely to said one direction.

3. In an electrode seal, a stationary annular rim, said rim having a plurality of spaced upstanding support plates, a pair of spaced rollers screwed to each of said support plates, a plurality of radial track bars each extending inwardly and downwardly between said rollers, and a plurality of elongate cylindrical segments each pivotally supported from the inner radial end of one of said track bars so as to define a generally vertical cylindrical aperture of variable diameter.

4. In an electrode seal, a stationary annular rim, said rim having a plurality of spaced upstanding support plates, a pair of spaced rollers secured to each of said support plates, a plurality of radial track bars each extending inwardly and downwardly between said rollers, a plurality of elongate cylindrical segments each pivotally supported from the inner radial end of one of said track bars so as to define a generally vertical cylindrical aperture of variable diameter, an arrester block supported by adjacent segments, and means for centering said arrester block between said adjacent segments irrespective of the diameter of said cylindrical aperture.

5. In an electrode seal, a stationary annular rim, said rim having a plurality of spaced upstanding support plates, a pair of spaced rollers secured to each of said support plates, a plurality of inclined radial track bars each extending inwardly and downwardly between said rollers, a plurality of elongate cylindrical segments each pivotally supported from the inner radial end of one of said track bars so as to define a cylindrical aperture of variable diameter, each of said segments having a rectangular notch in the upper corner thereof with adjacent notches in adjacent segments defining a recess, a plurality of arrester blocks each supported by adjacent segments in one of said recesses, the outwardly radial side of each of said blocks being formed with a vertical track, a slider in said track, and a pair of links pivotally connected between said slider and said adjacent segments so as to center each of said blocks between adjacent segments irrespective of the diameter of aperture formed by said segments.

6. In an electrode seal, an annular horizontal rim, a plurality of radial track bars each inwardly and downwardly inclined, means slidably supporting each of said track bars from said rim, and a plurality of elongate cylindrical segments defining a generally vertical aperture therethrough, each of said segments being pivotally supported from the inner radial end of one of said track bars, the arrangement being such that each segment is inwardly and downwardly slidable by gravity so as to tend to cause said cylindrical aperture to assume a configuration of lesser diameter.

7. In an electrode seal, an annular horizontal rim, a plurality of radial track bars each inwardly and downwardly inclined, means slidably supporting each of said track bars from said rim, a plurality of elongate cylindrical segments defining a generally vertical aperture therethrough, each of said segments being pivotally supported from the inner radial end of one of said track bars, the arrangement being such that each segment is inwardly and downwardly slidable by gravity so as to tend to cause said cylindrical aperture to assume a configuration of lesser diameter, an arrester block supported by adjacent segments, and means for centering said arrester block between adjacent segments irrespective of the diameter of said cylindrical aperture.

8. In an electrode seal, an annular horizontal rim, a plurality of radial track bars each inwardly and downwardly inclined, means slidably supporting each of said track bars from said rim, a plurality of elongate cylindrical segments defining a generally vertical aperture therethrough, each of said segments being pivotally supported from the inner radial end of one of said track bars, the arrangement being such that each segment is inwardly and downwardly slidable by gravity so as to tend to cause said cylindrical aperture to assume a configuration of lesser diameter, each of said segments having a rectangular notch in the upper corner thereof with adjacent notches in adjacent segments defining a recess, a plurality of arrester blocks each supported by adjacent segments in one of said recesses, the outwardly radial side of each of said blocks being formed with a vertical track, a slider in said track, and a pair of links pivotally connected between said slider and said adjacent segments.

9. In an electrode seal, an annular horizontal rim, a plurality of radial track bars each inwardly and downwardly inclined, means slidably supporting each of said track bars from said rim, a plurality of elongate cylindrical segments defining a generally vertical aperture therethrough, each of said segments being pivotally supported from the inner radial end of one of said track bars at a point above its center of gravity tending to cause each segment to pivot about its support point in one direction, and a pair of spaced counterweights secured to each segment above said support point tending to cause each segment to pivot about said support point oppositely to said one direction.

10. In an electrode seal, an annular horizontal rim, a plurality of radial track bars each inwardly and downwardly inclined, means slidably supporting each of said track bars from said rim, and a plurality of elongate cylindrical segments defining a generally vertical aperture therethrough, each of said segments being pivotally supported from the inner radial end of one of said track bars at a point above its center of gravity tending to cause each segment to pivot about its support point in one direction, a pair of spaced counterweights secured to each segment above said support point tending to cause each segment to pivot about said support point oppositely to said one direction, a plurality of arrester blocks, and means for centering each of said blocks between adjacent segments so as to form a gastight seal therebetween.

11. In an electrode seal, an annular horizontal rim, a plurality of radial track bars each inwardly and downwardly inclined, means slidably supporting each of said track bars from said rim, a plurality of elongate cylindrical segments defining a generally vertical aperture therethrough, each of said segments being pivotally supported from the inner radial end of one of said track bars at a point above its center of gravity tending to cause each segment to pivot about its support point in one direction, a pair of spaced counterweights secured to each segment above said support point tending to cause each segment to pivot about said support point oppositely to said one direction, each of said segments having a rectangular notch in the upper corner thereof with adjacent notches in adjacent segments defining a recess, a plurality of arrester blocks each supported by adjacent segments in one of said recesses, the outwardly radial side of each said blocks being formed with a vertical track, a slider in said track, and a pair of links pivotally connected between said slider and said adjacent segments.

References Cited in the file of this patent

UNITED STATES PATENTS

| 2,845,468 | Haavik | July 29, 1958 |

FOREIGN PATENTS

| 846,600 | France | June 12, 1939 |
| 43,158 | Norway | Oct. 11, 1926 |